No. 621,360. Patented Mar. 21, 1899.
H. E. MILLER.
MEANS FOR PROTECTING SURFACE OF GLASS DURING MANUFACTURE INTO MIRRORS.
(Application filed Jan. 6, 1899.)
(No Model.)
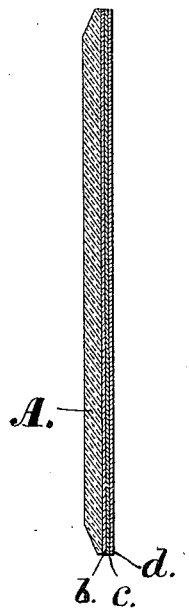
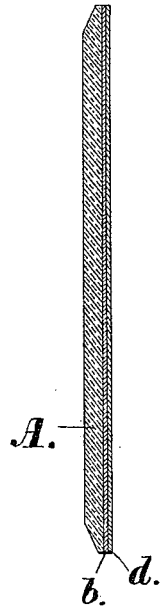
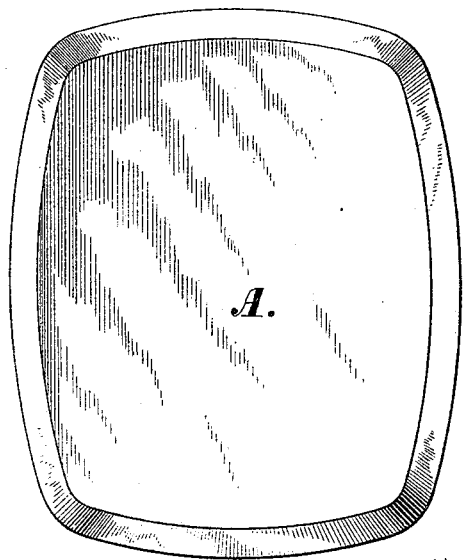
WITNESSES:
Fr. N. Roehrich
James C. Reilly
INVENTOR
Horace E. Miller,
BY
J. E. Hindon Hyde
ATTORNEY

UNITED STATES PATENT OFFICE.

HORACE E. MILLER, OF NEWARK, NEW JERSEY, ASSIGNOR TO THE CELLULOID COMPANY, OF NEW YORK, N. Y., A CORPORATION OF NEW JERSEY.

MEANS FOR PROTECTING SURFACES OF GLASS DURING MANUFACTURE INTO MIRRORS.

SPECIFICATION forming part of Letters Patent No. 621,360, dated March 21, 1899.

Application filed January 6, 1899. Serial No. 701,335. (No model.)

*To all whom it may concern:*

Be it known that I, HORACE E. MILLER, a citizen of the United States, residing at Newark, in the county of Essex and State of New Jersey, have invented a new and useful Protected Glass to be Silvered for Use as a Mirror, of which the following is a specification.

The object of my invention is to provide means for protecting the surface of glass to be manufactured into mirrors during the process of manufacture and thereafter until the glass is silvered, beveled, or otherwise finished.

One advantage of my invention is to secure a satisfactory quality of silvering for small beveled looking-glasses of which Germany is the principal source of supply. Said glasses as now silvered in Germany deteriorate in quality. In time the silver becomes oxidized and the looking-glass spoiled for commercial use, while in this country it is possible to obtain a superior quality of silvering, which does not change.

It is the custom in Germany to silver glass in large sheets, which are subsequently cut into small sizes, beveled, and finished as mirrors; but the process which said glass goes through after being silvered produces causes which in time affect the quality of silvering and eventually destroy its value. To silver small beveled glasses successfuly, it is necessary while beveling and thereafter to protect the highly-polished surface to be silvered from injury liable through handling and exposure to the atmosphere. This protection must be of a nature not to injure the polished surface and to be readily removable by means of such a nature as not to cause injury. It is known that paint in the ordinary sense of the word will adhere to glass; but it is practically impossible to remove paint from a polished surface so sensitive to touch or exposure without injury to the surface, which may not be seen by the naked eye until after the glass is silvered.

My invention is illustrated in the accompanying drawings, in which—

Figure 1 is a sectional view of a glass to which my coating in its preferred form has been applied, the coating being shown on an enlarged scale. Fig. 2 is a sectional view of a glass having my coating applied in a modified form. Fig. 3 is a front view of the beveled glass.

In my invention I apply a coating to the polished surface which is readily removed in hot water without injuring the polish either through the nature of the coating or by the means employed in its removal. While not entirely necessary, it is desirable to have a covering of protective paint over said coating in order to insure perfect waterproof conditions, and the coating which is imposed between the glass surface and the paint is softened by hot water until the coating may be lifted, together with the paint, from the surface of the glass. I prefer to have a black coating between the glass and the paint because black, being the absence of color, enables the workmen to observe when the beveled glasses are properly finished, whereas the workmen have formerly had to depend either on the clear glass or on the silvered surface for this purpose. Black is the only good temporary substitute for the opacity of silver, because all colors distort the apparent outline of beveling by adverse reflection, and they also hide defects of workmanship and defects in the glass. I have discovered that a coating suitable for my purpose consists of a liquid mixture of resins, pyroxylin, and well-known solvents of these substances, such as alcohols, essential oils, camphor-spirits, &c. I have found that an effective coating can be prepared as follows: resin, eleven parts; pyroxylin, one part, and a mixed solvent, composed of methyl alcohol, methyl acetate, and acetone, forty-four parts. I do not limit myself, however, to these proportions nor to these specific solvents, but simply give the above formula as an example. The coating may be applied by dipping, flowing, with a brush, or in any suitable manner. Nor do I confine my invention to the use of any particular kind of resin, but select those that best serve the purposes of cost and convenience. I have found that the best method of preparing the glass which is to be beveled and silvered is to first coat the polished back with my resin-pyroxylin mixture, then to superimpose a black spirit varnish, the spirit being a solvent of the black pigment, resin, and pyroxylin, and, lastly, to cover the black varnish with a coat of protective paint.

Referring to the drawings, A represents the beveled glass. The resin-pyroxylin coating is represented by b, while c and d, respectively, are the black varnish and the protective paint. In Fig. 2 b represents the resin-pyroxylin coating having the black coloring-matter incorporated therewith, as next hereinafter described. It is obvious, however, that the black pigment may be mixed in the resin-pyroxylin solution, and it would be within my invention to omit the coating of paint. By black pigment I mean a substance which is practically black and impervious to light. The principle of my coating is that the resins have a sticky or adherent quality, which holds the coating to the surface of the glass, while the pyroxylin or collodion toughens the coating, thereby producing a strong hard coating well calculated to resist injury in handling. The resins by themselves would be difficult to remove by reason of their sticky nature. Collodion by itself by reason of its tough hard nature and tendency to shrink in drying would not retain its place on the glass surface. I have discovered that by combining the two classes of substances the resins overcome the said tendency of collodion to shrink when dry and cold, and the collodion when subjected to hot water overcomes the stickative nature of the resins.

Glass prepared for mirrors when coated as described and further protected, if desired, by suitable paint though an unfinished article commercially is a finished product as far as my invention is concerned and, so far as I know, has never been made before.

What I claim is—

1. Glass to be manufactured into mirrors, said glass having a protective covering of resin and pyroxylin, substantially as described.

2. Glass to be manufactured into mirrors, said glass having a protective covering of resin and pyroxylin dissolved in solvents of the same, substantially as described.

3. Glass to be manufactured into mirrors, said glass having a protective covering of resin, pyroxylin and a black color, substantially as described.

4. Glass to be manufactured into mirrors, said glass having a protective coating of resin and pyroxylin, covered by a black varnish, substantially as described.

5. Glass to be manufactured into mirrors, said glass having a protective coating consisting of (1) a layer of resin and pyroxylin, (2) a layer of black varnish, and (3) a layer of protective paint, substantially as described.

HORACE E. MILLER.

Witnesses:
HARRY V. FOUNTAIN,
JAMES C. REILLY.